(12) United States Patent
Zhou et al.

(10) Patent No.: US 12,445,163 B2
(45) Date of Patent: Oct. 14, 2025

(54) SIGNAL COMMUNICATION TERMINAL AND SIGNAL COMMUNICATION SYSTEM

(71) Applicant: SHENZHEN HUAPTEC CO., LTD, Shenzhen (CN)

(72) Inventors: Songlin Zhou, Shenzhen (CN); Yanlin Xie, Shenzhen (CN); Yanwei Wang, Shenzhen (CN)

(73) Assignee: SHENZHEN HUAPTEC CO., LTD, Shenzhen (CN)

( * ) Notice: Subject to any disclaimer, the term of this patent is extended or adjusted under 35 U.S.C. 154(b) by 577 days.

(21) Appl. No.: 17/944,200

(22) Filed: Sep. 14, 2022

(65) Prior Publication Data

US 2024/0048172 A1 Feb. 8, 2024

(30) Foreign Application Priority Data

Aug. 3, 2022 (CN) .......................... 202210926652.2

(51) Int. Cl.
*H04B 1/44* (2006.01)
(52) U.S. Cl.
CPC ..................................... *H04B 1/44* (2013.01)
(58) Field of Classification Search
CPC ......... H04W 88/06; H04B 1/401; H04B 1/40; H04B 1/44
See application file for complete search history.

(56) References Cited

U.S. PATENT DOCUMENTS

| | | | |
|---|---|---|---|
| 6,208,846 B1 * | 3/2001 | Chen | H04W 52/52 455/69 |
| 11,916,301 B2 * | 2/2024 | Kim | H01Q 1/243 |
| 2014/0342678 A1 * | 11/2014 | Khlat | H04B 1/44 455/78 |

* cited by examiner

*Primary Examiner* — Patrick C Chen

(57) ABSTRACT

The present disclosure provides a signal communication terminal and a signal communication system. The signal communication terminal includes at least a set of signal enhancement branches and a routing circuit connected with each of the signal enhancement branches. The signal enhancement branch includes a first antenna, a second antenna, a first switching circuit, a second switching circuit, and a first signal processing circuit, where the first switching circuit is connected with each of the first antenna and the first signal processing circuit, the second switching circuit is connected with each of the first signal processing circuit and the routing circuit, and the first signal processing circuit is connected with the second antenna, so as to solve the existing technical problem that the speed of the broadband network of the device for converting the mobile network to the broadband network will be greatly decreased when the mobile signal is weak.

9 Claims, 7 Drawing Sheets

SIGNAL COMMUNICATION TERMINAL AND SIGNAL COMMUNICATION SYSTEM

CROSS REFERENCE TO RELATED APPLICATIONS

The present disclosure claims priority to Chinese Patent Application No. 202210926652.2, filed Aug. 3, 2022, which is hereby incorporated by reference herein as if set forth in its entirety.

BACKGROUND

1. Technical Field

The present disclosure relates to communication technology, and particularly to a signal communication terminal and a signal communication system.

2. Description of Related Art

There is an existing device that can convert 3G, 4G, 5G or other mobile networks into a broadband network (e.g., a Wi-Fi hotspot or network port signals), which is usually a product such as a USB dongle, a 3G/4G network card, a MiFi, a portable Wi-Fi, a mobile Wi-Fi, a CPE (customer premise equipment), and a 4G router. These products can provide Wi-Fi hotspots or network signals for terminal devices such as mobile phones, tablets and computers without connecting to a broadband network. Usually, such devices have a mobile network baseband first control circuit (including but not limited to a baseband first control circuit of GSM, EDGE, CDMA, WCDMA, 4G LTE, 5G or other network standards), a radio frequency transceiver, a memory chip, a filter, a duplexer, an RF switch, a Wi-Fi chip or a network port chip, a SIM card and other parts, a mobile network antenna, a Wi-Fi antenna, and a network port, which has the basic principle that receives the base station signal through the mobile network antenna, and then transmits the signal to the RF (radio frequency) transceiver for processing after passing through the RF switch, duplexer and the filter, and sends the processed signal to the baseband first control circuit to convert into data and send to a Wi-Fi chip or a network port chip. The Wi-Fi chip or network port chip converts the data of the baseband chip into Wi-Fi hotspot wireless signals of 2.4 GHz or 5 GHz to transmit through the Wi-Fi antenna. The terminal device within the coverage of the Wi-Fi antenna can use the signals of the hotspot, while the Wi-Fi chip or network port chip can further convert the baseband data into network port signals through a network port conversion chip so as to send to the wired network interface. The terminal device can be connected to its network port through the network cable and then surf the Internet. In turn, the priority network data or wireless Wi-Fi signal of the terminal device also enters the network port and the Wi-Fi antenna, and the data and signals of the network port and the Wi-Fi antenna are sent to the Wi-Fi chip or the network port chip, then the Wi-Fi chip or the network port chip processes the data and signals to send to the baseband chip. The baseband chip processes the data to send to the radio frequency transceiver, then the signal is transmitted to the base station through the mobile network antenna after passing through the components such as the filter, the duplexer, and the RF switch.

Usually, the device that converts the mobile network to the broadband network can only play a better role when the mobile network signal is good, the speed of the broadband network of the device for converting the mobile network to the broadband network will be greatly decreased when the mobile signal is weak, and it will even not work when the mobile signal is very weak.

SUMMARY

The purpose of the present disclosure is to provide a signal communication terminal and a signal communication system to solve the existing technical problem that the speed of the broadband network of the device for converting the mobile network to the broadband network will be greatly decreased when the mobile signal is weak.

In order to achieve the above-mentioned purpose, the present disclosure provides a signal communication terminal including at least a set of signal enhancement branches and a routing circuit (see FIG. 1), where:

the routing circuit connects with each of the signal enhancement branches to receive an uplink signal and to send a downlink signal, where the routing circuit outputs a corresponding first switching signal and second switching signal according to the downlink signal;

the signal enhancement branch includes a first antenna, a second antenna, a first switching circuit, a second switching circuit, and a first signal processing circuit;

the first switching circuit is connected with the first antenna and the first signal processing circuit; the second switching circuit is connected with the first signal processing circuit and the routing circuit; and the first signal processing circuit is connected with the second antenna;

the first antenna is configured to receive a first downlink signal and send a first uplink signal;

the second antenna is configured to send the first downlink signal and receive the first uplink signal;

the first switching circuit is configured to switch a path between the first switching circuit and the second switching circuit according to the first switching signal;

the second switching circuit is configured to switch the path between the first switching circuit and the second switching circuit according to the second switching signal so as to work together with the first switching circuit to:

turn on at least one of a path among the first switching circuit, the first signal processing circuit, and the second switching circuit and a path among the first switching circuit, the first signal processing circuit, and the second antenna so as to output at least one of the first downlink signal after conversion and amplification processing and the first uplink signal after conversion and amplification processing, in response to a strength of the first downlink signal being lower than a preset first signal strength; and turn on a path between the first switch circuit and the second switch circuit so as to directly output at least one of the first downlink signal and the first uplink signal, in response to the strength of the first downlink signal being higher than or equal to the preset first signal strength.

In order to achieve the above-mentioned purpose, the present disclosure further provides a signal communication system including a signal communication system base station, a mobile terminal, a routing terminal and the above-mentioned signal communication terminal;

where, the signal communication system base station communicates with the first antenna of the signal communication terminal, the mobile terminal communicates with the second antenna of the signal communication terminal, and the routing terminal communicates with the routing circuit of the signal communication terminal.

In the present disclosure, the first downlink signal is received and the first uplink signal is sent through the first antenna; the first downlink signal is sent and the first uplink signal is received through the second antenna; and the second switching circuit is configured to work together with the first switching circuit to: turn on a path among the first switching circuit, the first signal processing circuit, and the second switching circuit and/or a path among the first switching circuit, the first signal processing circuit, and the second antenna so as to output the first downlink signal after conversion and amplification processing and/or the first uplink signal after conversion and amplification processing, in response to a strength of the first downlink signal being lower than a preset first signal strength; and turn on a path between the first switch circuit and the second switch circuit so as to directly output the first downlink signal and/or the first uplink signal, in response to the strength of the first downlink signal being higher than or equal to the preset first signal strength. The above-mentioned signal processing circuit performs a conversion and amplification processing on the first downlink signal and the first uplink signal when the strength of the downlink signal is lower than the preset first signal strength, so as to provide the enhanced signal to the mobile device connected to the routing circuit or that connected to the second antenna in a convenient and quick manner, thereby solving the existing technical problem that the speed of the broadband network of the device for converting the mobile network to the broadband network will be greatly decreased when the mobile signal is weak.

BRIEF DESCRIPTION OF THE DRAWINGS

The present disclosure will be further described in conjunction with the drawings and embodiments as below.

DETAILED DESCRIPTION

Figure 1:
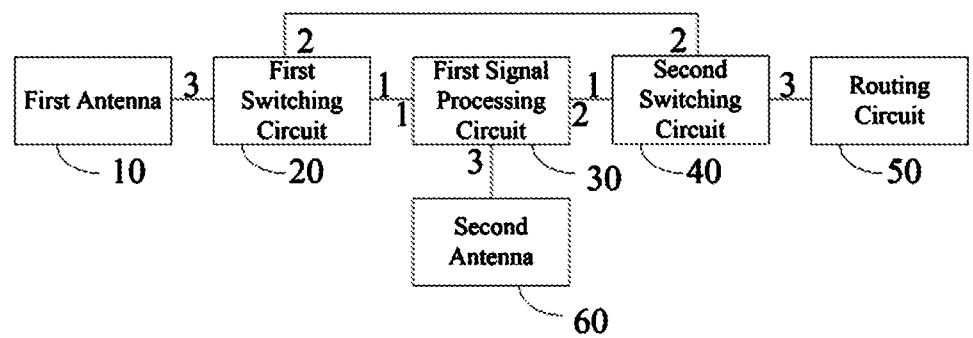
FIG. 1 is a schematic diagram of the modules of a signal communication terminal according to an embodiment of the present disclosure.

The embodiments of the present disclosure will be described in detail as below, and some embodiments of the present disclosure will be shown in the drawings. The drawings are for supplementing the description of the text part of the present disclosure with graphics, so that each technical feature and the overall technical solution of the present disclosure can be understood intuitively and vividly, but they cannot be construed as limitations on the protection scope of the present disclosure.

In order to solve the technical problem of the in-accuration in the existing determination method of self-exciton, the present disclosure provides a signal communication terminal and a signal communication system.

In one embodiment, as shown in FIG. 1, the signal communication terminal includes at least a set of signal enhancement branches and a routing circuit 50. The routing circuit 50 is connected with each of the signal enhancement branches, and is used for receiving uplink signals and sending downlink signals and for outputting corresponding first switching signals and second switching signals according to the downlink signal. The signal enhancement branch includes a first antenna 10, a second antenna 60, a first switching circuit 20, a second switching circuit 40, and a first signal processing circuit 30. In which, the first switching circuit 20 is connected with each of the first antenna 10 and the first signal processing circuit 30; the second switching circuit is connected with each of the first signal processing circuit 30 and the routing circuit and the first signal processing circuit 30 is connected with the second antenna 60.

Therefore, the enhanced signals can be provided to a device such as MiFi that is connected by the routing circuit 50 or the second antenna 60 in a convenient and quick manner, thereby solving the existing technical problem that the speed of the broadband network of the device for converting the mobile network to the broadband network will be greatly decreased when the mobile signal is weak.

In the case of weak wireless mobile signals, the user of terminal devices can use a wireless signal booster which is usually a device such as a repeater, a Mangebao, and a mobile phone signal amplifier to amplify the signals. These signal boosters are usually installed in home, office, vehicle, shopping mall, subway, mountain or other application scenarios. For anywhere of weak or no mobile signals, this type of signal booster can be considered to use for amplifying the signals. This type of signal booster usually consists of components, for example, a duplexer, an analog or digital type filter, an amplifier tube, a detector, a controller, a radio frequency cable, an antenna, and the like. The signals of a base station are received through a BS (base station) end antenna to enter a first downlink branch for amplifying and then transmitted through a MS (mobile station) end antenna to cover the weak signal areas, and the MS end antenna receives the mobile phone signals in the weak signal areas to enter an uplink branch then transmit to the base station through the BS end antenna after amplification and other processing.

The general signal booster has components, for example, a duplexer, an analog or digital filter, an amplifier tube, a detector, a controller, a radio frequency cable, an antenna, and the like, which results in large size, complex circuit and high cost and is not suitable for providing signals alone for the device for switching from the mobile network to the broadband network.

In the scheme of the present disclosure, the signal enhancement circuit, that is, the first signal processing circuit 30, is directly added to the routing device, and there are disposed with the first antenna 10, the second antenna 60, the first switching circuit and the second switching circuit 40 that assist its function realization so that the antenna of the routing device and the routing circuit 50 can be directly used to realize a part of the functions of the signal booster, thereby achieving the effects of signal amplification and size reduction.

Further effects of the scheme of the present disclosure: providing Wi-Fi hotspots or broadband networks in various scenarios where the signal is too strong or weak, or even no signal. When the signal is too strong, the signal enhancement function of the first signal processing circuit 30 can be turned off to reduce power consumption, and at the same time the signal booster can be bypassed so that the device for switching from the mobile network to the broadband network can directly receive external signals, which can completely avoid the interference of the signal booster to the routing circuit 50 and the base station in an environment of strong signal.

Furthermore, a second antenna 60 is further provided to extract a part of the signal of the first signal processing circuit 30, so that when the first signal processing circuit 30 which has the signal flowing to the routing circuit 50 is improperly installed and therefore self-excited, the transmission of the signal can be realized through the second antenna 60.

In one embodiment, the circuit connection scheme of the above-mentioned embodiment can be implemented with reference to the following connection relationship. As shown in FIG. 1, the first signal processing circuit 30 includes a first terminal 1, a second terminal 2 and a third terminal 3. The first switching circuit 20 has a first terminal 1, a second terminal 2 and a third terminal 3; the second switching circuit 40 has a first terminal 1, a second terminal 2 and a third terminal 3; and the routing circuit 50 has a first terminal 1. The first terminal of the first signal processing circuit 30 is connected to the first terminal 1 of the first switching circuit 20, the second terminal 2 of the first signal processing circuit 30 is connected to the first terminal 1 of the second switching circuit 40, and the third terminal 3 of the first signal processing circuit 30 is connected to the second antenna 60. The second terminal 2 of the first switching circuit 20 is connected to the second terminal 2 of the second switching circuit 40, and the third terminal 3 of the first switching circuit 20 is connected to the first antenna 10. The third terminal 3 of the second switching circuit 40 is connected to the first terminal 1 of the routing circuit 50.

The first switching circuit 20 turns on the corresponding path according to the first switching signal, and the second antenna switching circuit 40 turns on the corresponding path according to the first switching signal. Specifically, when the strength of the downlink signal is higher than or equal to that of the preset first signal strength, the path between the third terminal 3 and second terminal 2 of the first switching circuit 20 is turned on; when the strength of the downlink signal is lower than the preset first signal strength, the first switching circuit 20 turns on the path between the first terminal 1 and third terminal 3 of the first switching circuit 20; when the strength of the downlink signal is higher than or equal to the preset second signal strength, the second switching circuit 40 turns on the path between the third terminal 3 and second terminal 2 of the second switching circuit 40; and when the strength of the downlink signal is lower than the preset second signal strength, the path between the first terminal 1 and third terminal 3 of the second switching circuit 40 is turned on. Through the above-mentioned process, the switching between various paths can be flexibly realized. At this time, the control process may be implemented by the routing circuit 50, or be implemented by an additionally provided control circuit.

Figure 4:
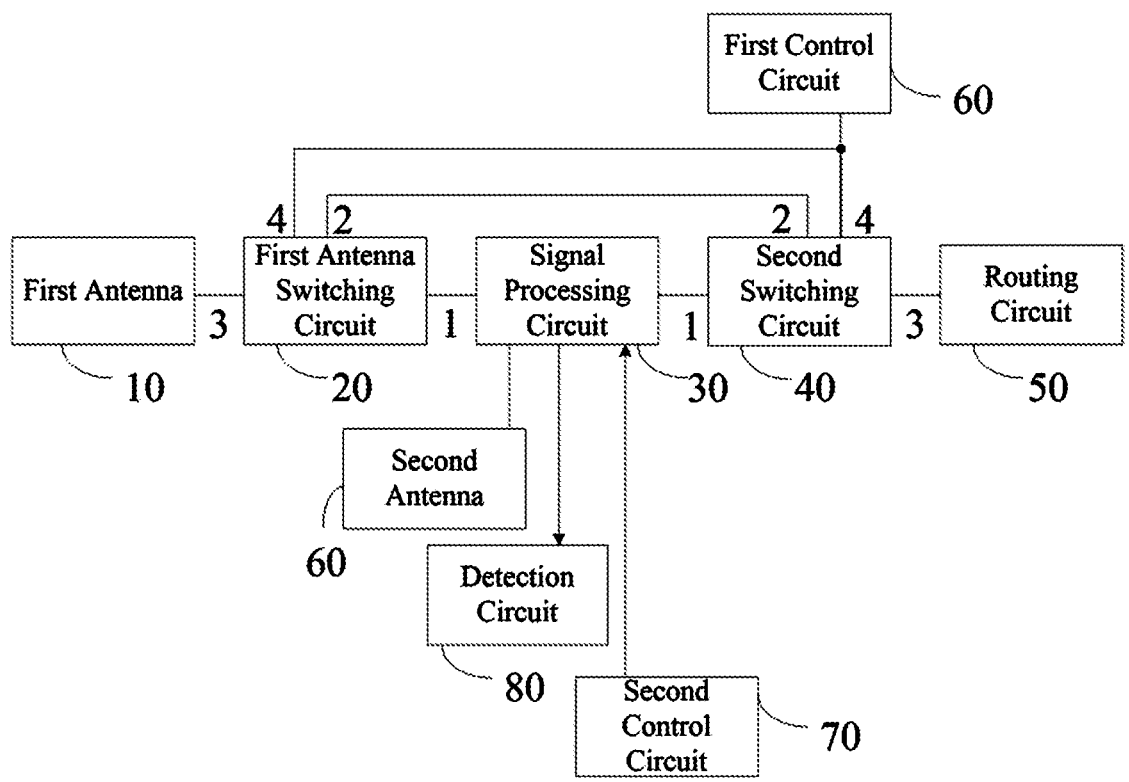
FIG. 4 is a schematic diagram of the modules of a signal communication terminal according to an embodiment of the present disclosure.

As shown in FIG. 4, in one embodiment, the first switching circuit 20 further includes a controlled terminal, and the second switching circuit 40 further includes a controlled terminal. The controlled terminal of the first switching circuit 20 and that of the second switching circuit 40 are both connected to the routing circuit 50.

In which, the routing circuit 50 has the function of a control circuit at this time, and can realize the function of outputting the corresponding first switching signal and second switching signal according to the downlink signal, so that a path between the first switching circuit 20 and the second switching circuit 40 can be switched according to the strength of the downlink signal.

It should be noted that the routing circuit 50 specifically refers to a device such as MiFi or CPE that is capable of converting 3G, 4G, 5G and other mobile network signals provided by the base station into Wi-Fi broadband network (wireless) signals, wired broadband network signals, or Wi-Fi+ wired broadband network signals. The routing circuit 50 needs one or more input and output ports of mobile network signals, and usually has one or more Wi-Fi antenna ports, one or more wired broadband network ports, or one or more Wi-Fi antenna ports+ one or more wired broadband network ports.

In one embodiment, as shown in FIG. 4, the signal communication terminal further includes a first control circuit 60 that is electrically connected to at least one of the first antenna 10, the second antenna 60 and the routing circuit 50. The controlled terminal of the first switching circuit 20 and that of the second switching circuit 40 are both connected to the first control circuit 60.

In which, the first control circuit 60 is configured to obtain at least one of the first downlink signals in the first antenna 10, the second antenna 60, and the routing circuit 50, and turn on of a path among the first switching circuit 20, the first signal processing circuit 30 and the second switching circuit 40 and/or a path among the first switching circuit 20, the first signal processing circuit 30 and the second antenna 60 so as to output the first downlink signal after conversion and amplification processing and/or the first uplink signal after conversion and amplification processing in response to the strength of any one of the first downlink signals being lower than the preset first signal strength. Through the above-mentioned control process, when the strength of any of the downlink signals is low, the amplified downlink signal and uplink signal can be output by switching the signal into the amplification branch of the first signal processing circuit 30. Therefore, the speed of the broadband network of the device for converting the mobile network to the broadband network when the mobile signal is weak can be improved. That is, the strength of the downlink signal output by the routing circuit 50 and the second antenna 60 can be improved, and the strength of the uplink signal output by the first antenna 10 can be improved, simultaneously.

As shown in FIGS. 3 and 5-7, in one embodiment, the first switching circuit 20 includes a switching switch 1, a switching switch 2 and a power divider 3. A first connecting terminal of the switching switch 1 is the third terminal 3 of the first switching circuit 20, a second connecting terminal of the switching switch 1 is connected with a first connecting terminal of the switching switch 2, and a third connecting terminal of the switching switch 1 is connected with a first terminal 1 of the power divider 3; a second connecting terminal of the switching switch 2 is the first terminal 1 of the first switching circuit 20, and a third connecting terminal of the switching switch 2 is connected with a second terminal 2 of the power divider 3; and a third terminal 3 of the power divider 3 is the second terminal 2 of the first switching circuit 20. In which, a controlled terminal of the switching switch 1 is connected with a controlled terminal of the switching switch 2 at the controlled terminal of the first switching circuit 20.

In which, the power divider 3 can divide the signal conducted by the switching switch into a plurality of parts, and can change the strength of the signal of the first switching circuit 20 that is directly passed to the second switching circuit 40 according to the actual needs, and can also change the strength of the signal output to the first signal processing circuit. 30. Therefore, intelligence can be realized, so that when the required signal strength is slightly increased, the signal can be directly passed to the second switching circuit 40 through the first switching circuit 20 as much as possible, and further reduce the possible interference that is generated by the first signal processing circuit 30.

In one embodiment, as shown in FIGS. 2-3 and 5-9, the first switching circuit 20 and the second antenna switching circuit 40 may be implemented using a single-pole double-throw radio frequency (RF) switch, where the single-pole double-throw radio frequency switch can switch the conduction relationship in a flexible manner according to the types and strengths of the uplink and downlink signals. It should be noted that the routing signal and the mobile signal are both uplink signals.

In one embodiment, as shown in FIGS. 2-3 and 5-6, the first signal processing circuit 30 includes N first uplink branches 301, N first downlink branches 302, N second uplink branches 303, N second downlink branches 304, N first duplex branches 305, N second duplex branches 306, and N third duplex branches 307.

Figure 2:
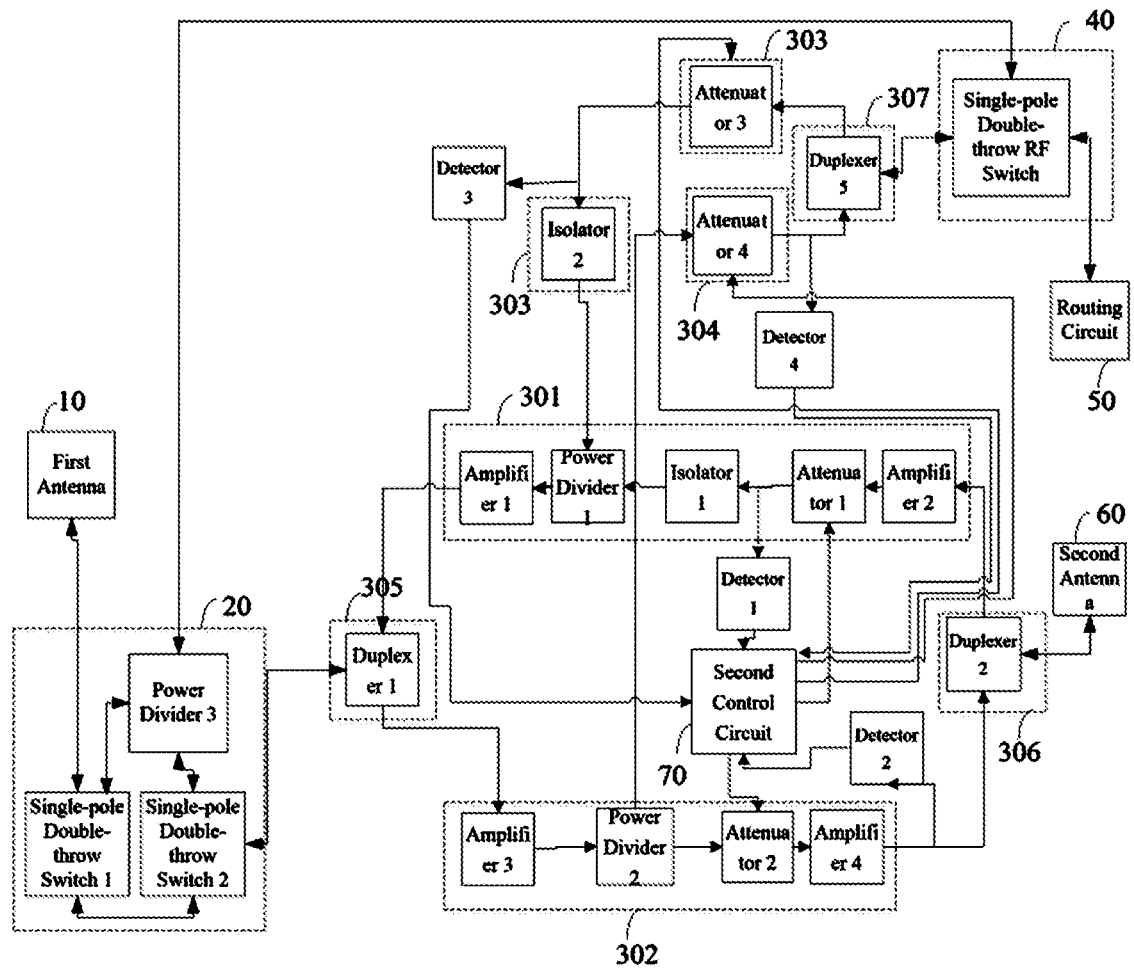
FIG. 2 is a schematic diagram of the circuit of a signal communication terminal according to an embodiment of the present disclosure.
Figure 7:
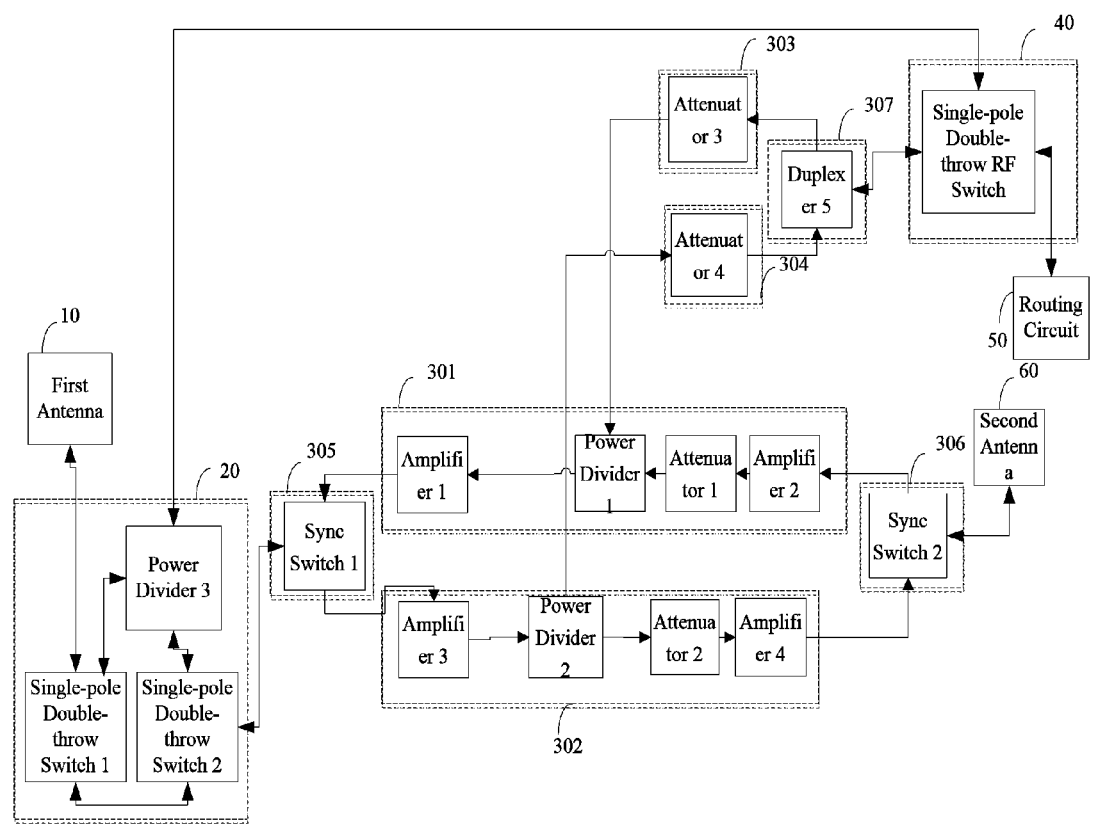
FIG. 7 is a schematic diagram of the circuit of a signal communication terminal according to an embodiment of the present disclosure.

The first duplex branch 305 has an input and output terminal, an uplink signal input terminal and a downlink signal output terminal; the second duplex branch 306 has an input and output terminal, an uplink signal output terminal and a downlink signal input terminal; and the third duplex branch 307 has an input and output terminal, an uplink signal output terminal and a downlink signal input terminal. The first downlink branch 302 includes an input terminal, a first output terminal and a second output terminal, and the first uplink branch 301 includes a first input terminal, a second input terminal and an output terminal;

As shown in FIG. 2 and FIG. 7, when N=1, the downlink signal output terminal of the first duplex branch 305 is connected with the input terminal of the first downlink branch 302, the uplink signal input terminal of the first duplex branch 305 is connected with the output terminal of the first uplink branch 301, and the input and output terminal of the first duplex branch 305 is the first terminal of the first signal processing circuit 30; the downlink signal input terminal of the second duplex branch 306 is connected with the first output terminal of the first downlink branch 302, the uplink signal output terminal of the second duplex branch 306 is connected with the first input terminal of the first uplink branch 301, and the input and output terminal of the second duplex branch 306 is the third terminal 3 of the first signal processing circuit 30; the input terminal of the second uplink branch 303 is connected with the uplink signal output terminal of the third duplex branch 307, and the output terminal of the second uplink branch 303 is connected with the second input terminal of the first uplink branch 301; the input terminal of the second downlink branch 304 is connected with the second output terminal of the first downlink branch 302, and the output terminal of the second downlink branch 304 is connected with the downlink signal input terminal of the third duplex branch 307; and the input and output terminal of the third duplex branch 307 is the second terminal 2 of the first signal processing circuit 30.

Figure 3:
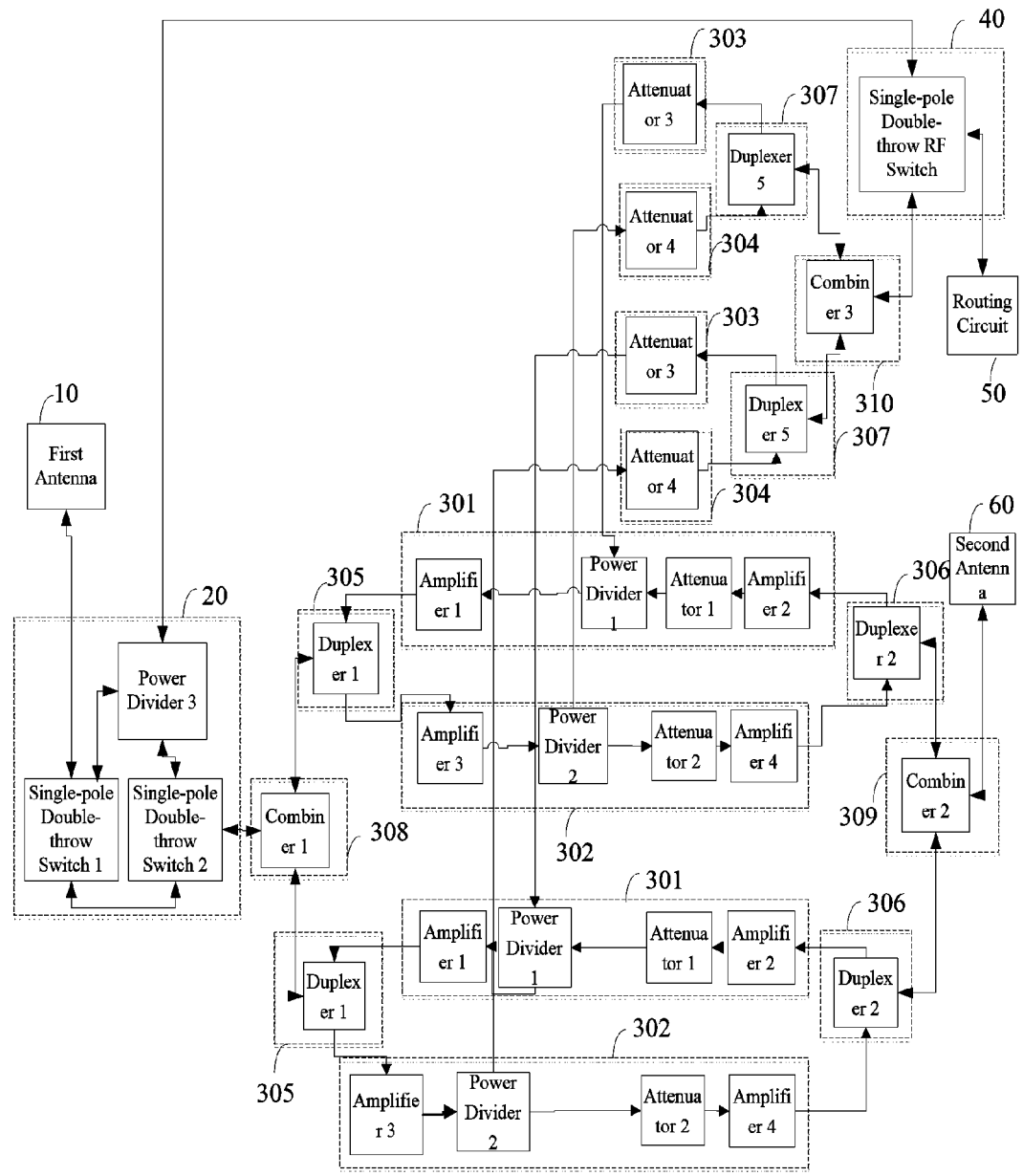
FIG. 3 is a schematic diagram of the circuit of a signal communication terminal according to an embodiment of the present disclosure.
Figure 6:
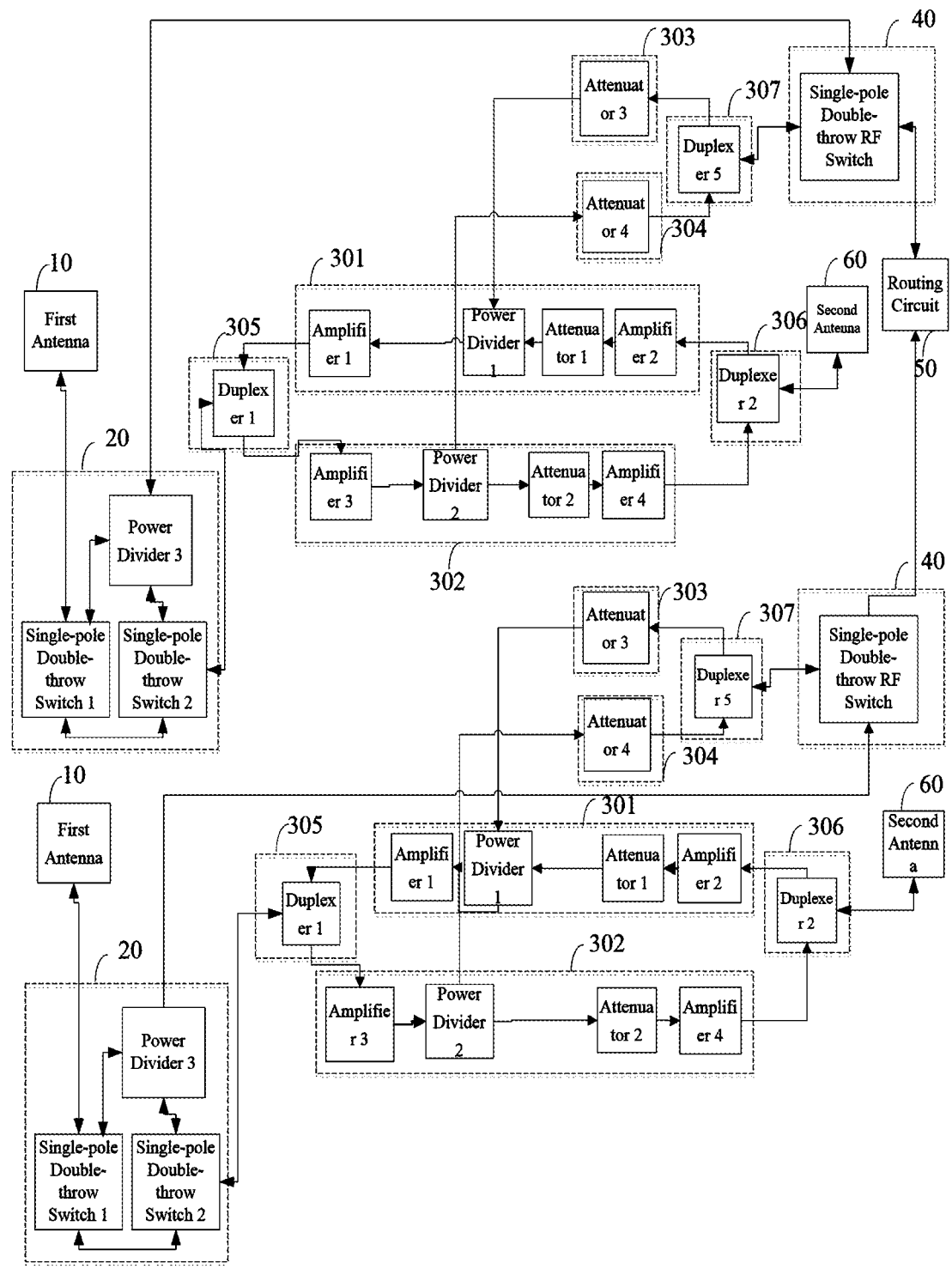
FIG. 6 is a schematic diagram of the circuit of a signal communication terminal according to an embodiment of the present disclosure.

As shown in FIG. 3 and FIG. 6, when N is an integer larger than or equal to 2, the first signal processing circuit 30 further includes a first combining branch 308, a second combining branch 309 and a third combining branch 310; the downlink signal output terminal of the N-th first duplex branch 305 is connected with the input terminal of the N-th first downlink branch 302, and the uplink signal input terminal of the N-th first duplex branch 305 is connected with the output terminal of the N-th first uplink branch 301; the input and output terminals of the N first duplex branches 305 are all connected with the first combining branch 308, and the signal exchange terminal of the first combining branch 308 is the first terminal 1 of the first signal processing circuit 30; the downlink signal input terminal of the N-th second duplex branch 306 is connected with the first output terminal of the N-th first downlink branch 302, and the uplink signal output terminal of the N-th second duplex branch 306 is connected with the first input terminal of the N-th first uplink branch 301; the input and output terminals of the N second duplex branches 306 are all connected with the second combining branch 309, and the signal exchange terminal of the second combining branch 309 is the third terminal 3 of the first signal processing circuit 30; the input terminal of the N-th second uplink branch 303 is connected with the uplink signal output terminal of the N-th third duplex branch 307, and the output terminal of the N-th second uplink branch 303 is connected with the second input terminal of the N-th first uplink branch 301; the input terminal of the N-th second downlink branch 304 is connected with the second output terminal of the N-th first downlink branch 302, and the output terminal of the N-th second downlink branch 304 is connected with the downlink branch input terminal of the N-th third downlink branch 307; and the input and output terminals of the N-th third duplex branches 307 are all connected with the third combining branch 310, and the signal exchange terminal of the third combining branch 310 is the second terminal 2 of the first signal processing circuit 30.

In which, the first combining branch is configured to combine output frequency bands of the N first uplink branch 301 of the first signal processing circuit 30 into the uplink signal to output to the first antenna 10, or split the downlink signal input by the first antenna 10 to input to the N first downlink branches 302 of the first signal processing circuit 30; the second combining branch is configured to combine output frequency bands of the N first downlink branch 302 of the first signal processing circuit into the downlink signal to output to the second antenna 60, or split the uplink signal input by the second antenna 60 to input to the N first uplink branches 301 of the first signal processing circuit 30; and the third combining branch is configured to combine output frequency bands of the N second downlink branch 304 of the first signal processing circuit 30 into the downlink signal to output to the routing circuit 50, or split the uplink signal input by the routing circuit 50 to input to the N second uplink branches 303 of the first signal processing circuit 30.

In the above-mentioned circuit, when the gains of the uplink branch and the downlink branch need to be high, the number of amplifiers in the branch can be increased as required. The position of the amplifier in the branch is not limited but is usually after the attenuator, and other devices such as filters can usually be added to the branch as required.

In one embodiment, the first combining branch, the second combining branch and the third combining branch can be realized using a variety types of combiner such as a power divider, an electric bridge, a dielectric combiner, a cavity combiner, a microstrip or a strip line direct combiner.

In one embodiment, as shown in FIGS. 3 and 5-7, the first uplink branch 301 includes an amplifier 1, a power divider 1, an attenuator 1 and an amplifier 2, where an input terminal of the amplifier 2 is the first input terminal of the first uplink branch 301, an output terminal of the amplifier 2 is connected with an input terminal of the attenuator 1, a first input terminal of the power divider 1 is connected with an output terminal of the attenuator 1, a second input terminal of the power divider 1 is the second input terminal of the first uplink branch 301, an output terminal of the power divider 1 is connected with an input terminal of the amplifier 1, and an output terminal of the amplifier 1 is the output terminal of the first uplink branch 301; and the first downlink branch 302 includes an amplifier 3, a power divider 2, an attenuator 2 and an amplifier 4, where an input terminal of the amplifier 3 is the first input terminal of the first downlink branch 302, an output terminal of the amplifier 3 is connected with an input terminal of the power divider 2; a first output terminal of the power divider 2 is connected with an input terminal of the attenuation 2, a second output terminal of the power divider 2 is the second output terminal of the first downlink branch 302; the output terminal of the attenuator 2 is connected with an input terminal of the amplifier 4; and an output terminal of the amplifier 4 is the first output terminal of the first downlink branch 302.

In one embodiment, as shown in FIG. 2, the first uplink branch 301 further includes an isolator 1 disposed between the power divider 1 and the attenuator 1.

The isolator 1 can isolate the signals of the first uplink branch 301 and the second uplink branch 303.

In one embodiment, as shown in FIG. 2, the second uplink branch 303 includes an attenuator 3, where an input terminal of the attenuator 3 is the input terminal of the second uplink branch 303, and an output terminal of the attenuator 3 is the output terminal of the second uplink branch 303; and the second downlink branch 304 includes an attenuator 4, where an input terminal of the attenuator 4 is the input terminal of the second downlink branch 304, and an output terminal of the attenuator 4 is the output terminal of the second downlink branch 304.

Or, the second uplink branch 303 may include an attenuator 3 and an isolator 2, where an input terminal of the attenuator 3 is the input terminal of the second uplink branch 303, and an output terminal of the attenuator 3 is the output terminal of the second uplink branch 303.

In one embodiment, as shown in FIG. 2, it further includes a second control circuit and a detection branch disposed with any one of the first uplink branch 301, the first downlink branch 302, the second uplink branch 303 and the second downlink branch 304 in one-to-one manner, where the second control circuit includes control terminals disposed corresponding to a number of the attenuators, and a detection terminal of the detection branch is disposed at the output terminal of the amplifiers in any of the branches, an output terminal of each detection branch is connected with the second control circuit, and the control terminals of the second control circuit are connected with the first uplink branch 301, a controlled terminal of the attenuator of the first downlink branch 302 and the second downlink branch 304, or the controlled terminal of the attenuator of the second downlink branch in one-to-one manner.

The detection branch corresponding to the first uplink branch 301 is composed of a detector 1, the detection branch corresponding to the first downlink branch 302 is composed of a detector 2, the detection branch corresponding to the second uplink branch 303 is composed of the detector 2, and the detection branch corresponding to the second downlink branches 304 is composed of a detector 4.

Figure 5:
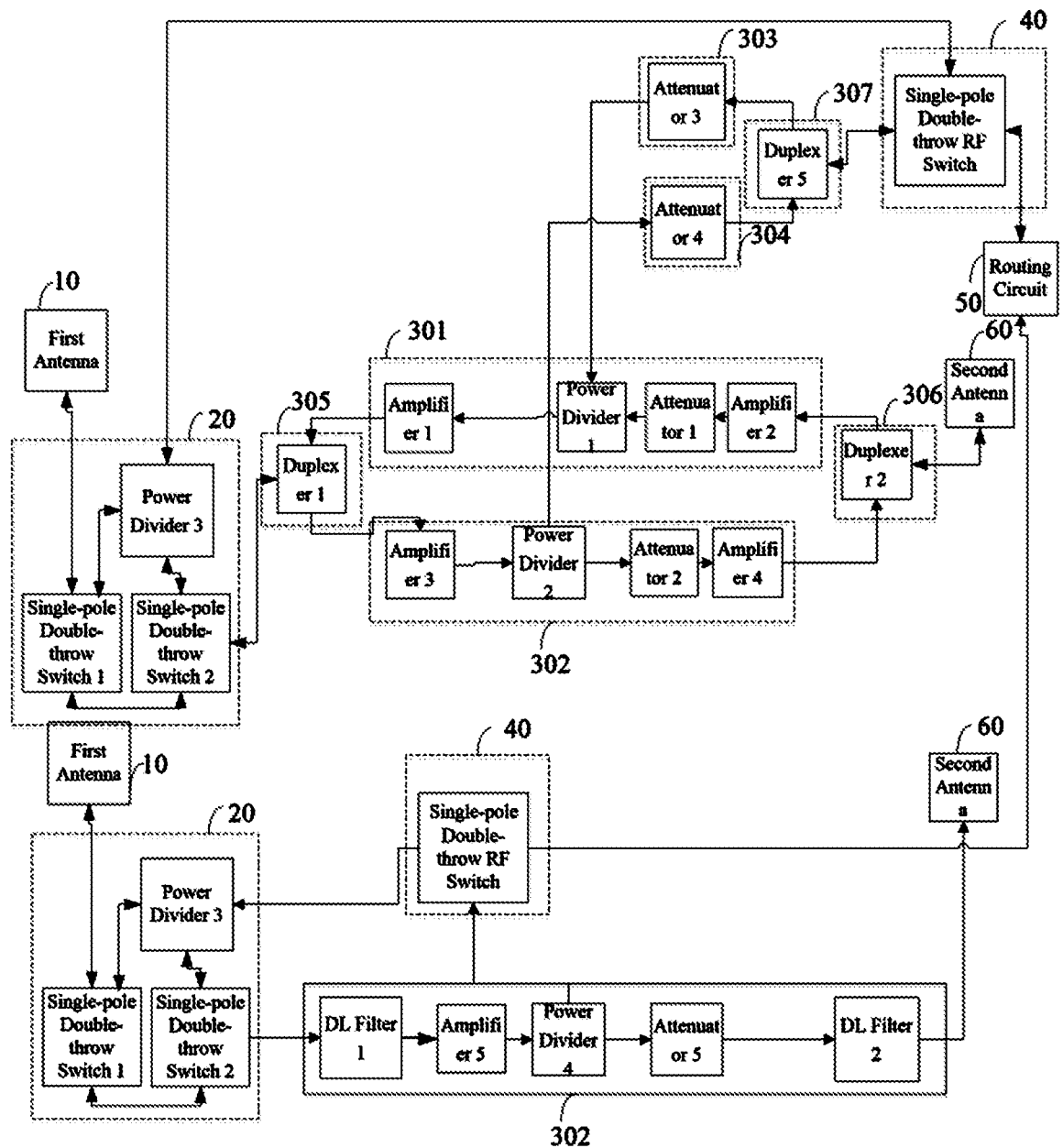
FIG. 5 is a schematic diagram of the circuit of a signal communication terminal according to an embodiment of the present disclosure.

In one embodiment, as shown in FIG. 5, the first antenna 10 is a BS downlink diversity antenna, and the second antenna 60 is a BS downlink diversity antenna. The first signal processing circuit 30 includes a filter 1, an amplifier 5, a power divider 4, an attenuator 5 and a filter 2, where an input terminal of the filter 1 is a first terminal of the first signal processing circuit 30, an output terminal of the filter 1 is connected with an input terminal of the amplifier 5, an input terminal of the power divider 4 is connected with an output terminal of the amplifier 5, a first output terminal of the power divider 4 is connected with an input terminal of the attenuator 5, a second output terminal of the power divider 4 is the second terminal 2 of the first signal processing circuit 30, an output terminal of the attenuator 5 is connected with an input terminal of the filter 2, and an output terminal of the filter 2 is the third terminal 3 of the first signal processing circuit 30.

At this time, in mobile communication, the base station will use two antennas to transmit downlink signals. Usually, devices such as MiFi and mobile communication devices such as mobile phones will use receive diversity technology. These devices use a main antenna including transmit and receive and a diversity receiving antenna for downlink receiving only, which can provide the users with better signal effects than a single main antenna in a signal environment that supports diversity receiving. Especially in high-speed applications such as Wi-Fi, diversity receiving is more important. Therefore, in this scheme, it further provides the technology of host+ diversity receiving. The above-mentioned embodiment belongs to diversity receiving which mainly adds a set of downlink branches, and the radio frequency parameters and control of the added set of downlink branches need to be consistent with the first set. If there are a plurality of frequency bands, a set of downlink branches or the downlink branches of some frequency bands are added for each frequency band, and a combiner is used to combine the downlink branches of different frequency bands. These downlink branches use an additional first antenna 10 (i.e., a BS downlink diversity antenna) together and an additional second antenna 60 (i.e., a MS downlink diversity antenna). The branch structure and control method are similar to the previous ones, and will not be repeated herein.

In one embodiment, as shown in FIGS. 6-7, the second antenna 60 is a MIMO (multi-input multi-output) antenna or one second antenna 60 (i.e., a MS antenna).

In one embodiment, the first duplex branch 305, the second duplex branch 306, and the second duplex branch 306 may be implemented using a duplexer or a synchronous switch. Referring to the duplexers 1, 2 and 3 of FIGS. 2-3 and 5-6, and the synchronous switch 1 and the synchronous switch 2 of FIG. 7.

It should be noted that when the gain of the branch 3 needs to be high, the number of amplifiers in the branch can be increased as required. The position of the amplifier in the branch is not limited but is usually after the attenuator, and other devices such as filters can usually be added to the branch as required. As shown in FIG. 7, the branch circuit can be implemented using a filter 1, an amplifier 5, an attenuator 5 and a filter 2 that are connected in sequence.

In one embodiment, the combiner circuit may be a variety types of combiner such as a power divider, an electric bridge, a dielectric combiner, a cavity combiner, a microstrip or a strip line direct combiner. At this time, a multi-frequency signal processing circuit 30 can be implemented, and the combiner acts as branches of different frequency bands.

The scheme of the present disclosure will be described with reference to FIG. 1-FIG. 7 as follows.

The scheme of the downlink signal will be described as follows.

As shown in FIGS. 1-2, after the downlink signal of the base station is received by the first antenna 10 (a BS antenna), it goes to the first switching circuit 20. When the downlink signal received by the first antenna 10 is weak, the single-pole double-throw RF switch 1 is controlled by the first control circuit 60 or the routing circuit to directly pass the signal to the duplexer 1. The duplexer 1 divides the received signal into an uplink signal (UL) and a downlink signal (DL) to go downwardly to the amplifier 3 (there is usually a low noise amplifier (LNA) in this position to ensure a good noise figure or signal to noise ratio, so as to ensure that the desired signal rather than the background noise can be amplified in the case that the signal received at the first antenna is very weak or has poor signal to noise ratio).

After passing through the amplifier 3, the signal goes downwardly to the downlink power divider 2/electric bridge (in some scenarios, there will be two or more amplifiers before this power divider 2 so as to ensure sufficient gain for MiFi or other device).

The downlink power divider 2/electric bridge will evenly distribute the signal into two channels: one is for the second downlink branch 304 and the other is for the remaining part of the first downlink branch 302. On the premise that the distribution ratio is well calculated, the power divider 2/electric bridge can be replaced by other signal distribution circuits such as couplers. The first downlink branch 302 usually receives the signal of the base station, as long as the signal for the routing circuit 50 and that for the first downlink branch 302 are distributed. The signal for the routing circuit and that for the first downlink branch 302 do not need to be isolated.

The signal from the downlink power divider 2/electric bridge to the remaining part of the first downlink branch 302 passes through the attenuator 2 and the amplifier 4 then goes to the duplexer 2, and then the signal amplified by the first downlink branch 302 goes to the second antenna 60 (a MS antenna) for transmitting. The amplified downlink signal transmitted by the second antenna 60 can be provided to a mobile communication terminal such as a mobile phone. Between the duplexer 1 and the duplexer 2, there may be not only the amplifier 4 but may be two or more amplifiers, which can be changed according to the gain as required and the same is true for the uplink.

The downlink power divider 2/electric bridge is used as a node for allocating signals to devices such as MiFi, which is usually positioned in the middle of the first downlink branch 302 to ensure that the gain of the signal provided to the devices is sufficient, so that the signals for the devices can pass through the devices or circuits such as amplifiers, filters, and controllers as little as possible. When there are more devices or circuits such as amplifiers, filters, and controllers in the first downlink branch 302, the more the overall radio frequency parameters of the first downlink branch 302 will degenerate. The same is true for the links of the uplink link and MiFi part.

The signal of the first downlink branch 302 is detected by the detector 2. The signal is usually detected at a certain point in the first downlink branch 302, and this point can be anywhere between the attenuator 2 and the duplexer 2. The detector 2 converts the detected signal into a signal (usually a voltage) that the first control circuit can process. The first control circuit 60 generates a second attenuation control signal to control the attenuation of the attenuator 2 by processing the detection signal of the detector 2, thereby realizing the signal control for the first downlink branch 302 which usually controls the parameters such as signal strength and interference of the first downlink branch 302 so as to usually prevent the signal from being too strong or reduce the interference. The detector 2 is usually a detection diode or a logarithmic detector, and the first control circuit 60 is usually, for example, a micro control unit (MCU), a FPGA and a CPU, or an analog negative feedback control circuit. According to the needs of specific products, there may be other components such as attenuator, amplifier, and filter. However, in the preset disclosure, it only illustrates the architecture of a common amplification chain, and only the necessary parts are extracted to explain how the amplification chain is combined with the circuit of the part of the devices such as MiFi.

Generally speaking, when it is detected that the signal is weak or there is no interference, the first control circuit 60 will control the attenuator 2 to release the attenuation to the maximum. When it is detected that the signal is too strong or there is interference, the first control circuit 60 will control the attenuator 2 to attenuate the gain until the signal is reduced to a normal range, or eliminates or improves the interference. Since the control of the amplification chain is a common control technique of the above-mentioned first signal circuit, it will not be repeated herein.

The signal from the power divider 2/electric bridge to the link part of a device such as MiFi passes through the attenuator 4, then goes to the duplexer 5, and then goes to the single-pole double-throw radio frequency switch. When the downlink signal received by the first antenna 10 (a BS antenna) is weak, the first control circuit 60 or the routing circuit 50 controls the single-pole double-throw radio frequency switch here to conduct the amplified downlink signal from the duplexer 5 to the routing circuit 50 so as to provide the amplified signal to the routing circuit 50. According to the requirement of the specific product, some amplifiers may also be added between the downlink power divider 2/electric bridge and the duplexer 5 so as to provide sufficient gain for the device or module such as MiFi.

The downlink detector 4 detects the signal of the second downlink branch 304. The signal is usually detected at a certain point in the second downlink branch 304, and this point can be anywhere between the attenuator 4 and the duplexer 5. The detector 4 converts the detected signal into a signal (usually a voltage) that the first control circuit 60 can process. The first control circuit 60 generates a fourth attenuation control signal to control the attenuation of the attenuator 4 by processing the signal of the detector 4, thereby realizing the signal control for the second downlink branch 304 which usually controls the parameters such as signal strength and interference of the second downlink branch 30 so as to usually prevent the signal from being too strong or reduce the interference. The detector is usually a detection diode or a logarithmic detector, and the attenuation value of the attenuator 4 may be controlled by using the signal strength parameter provided by the routing circuit 50 or the device itself as a detection value for the first control circuit 60. The first control circuit 60 is usually, for example, a micro control unit, a FPGA and a CPU, or an analog negative feedback control circuit. The first control circuit 60 used by the down-amplifying link may be used as this first control circuit 60 in a sharing manner, or other first control circuits 60 may be used alone. The control method is similar to that of the above-mentioned first downlink branch 302, but when the attenuator of the first downlink branch 302 attenuates the gain of the attenuator 2 due to interference such as self-excitation, the downlink branch 304 of the routing circuit 50 will not be affected and the attenuation value remains unchanged, which solves the problem that the mobile communication device such as a mobile phone may not work well due to the low gain after the first downlink branch 302 has interference attenuation gain by further providing network services through providing Wi-Fi hotspots using mobile devices such as mobile phones through the routing circuit 50 such as the MiFi part.

At the same time, according to the requirement of the specific product, for example, when the gain provided by the second downlink branch 304 to the part of MiFi is relatively low, there is usually no need to worry about the signal reaching the part of MiFi being too strong or causing interference, and the attenuator 4, the detector 4 and the corresponding control circuit may be removed to achieve the purpose of simplifying the circuit or reducing the cost.

After the downlink signal of the base station is received by the first antenna 10 (a BS antenna), it goes to the first switching circuit 20. When the downlink signal received by the first antenna 10 is too strong, the first control circuit 60 or the routing circuit 50 controls the single-pole double-throw radio frequency switch to divide the signal into two channels through the power divider 3/electric bridge: one reaches the duplexer 1 to amplify through the first downlink branch 302 so as to be transmitted by the second antenna 60 (a MS antenna) for mobile communication devices such as mobile phones to use, and the other reaches the switch in the second switching circuit 40. At this time, the switch of the second switching circuit 40 is set to be connected to the devices such as the power divider 3/electric bridge and MiFi in the first switching circuit 20, so that the first antenna 10 receives the signal to pass through the power divider 3/electric bridge in the first switching circuit 20, and the signal goes to the second switching circuit 40, and then the signal goes to the device or module of the routing circuit 50 such as MiFi. Through the combined control of the first switching circuit 20 and the second switching circuit 40, the first signal circuit can provide signals to mobile communication devices such as MiFi and mobile phones at the same time: when the received signal is weak, the first signal circuit may not only provide the enhanced signal to the routing circuit 50, but also may provide the enhanced signal to a mobile communication device such as a mobile phone through the second antenna 60. When the signal received by the first antenna 10 is too strong, the received signal is divided into two channels by the power divider 3/electric bridge in the first switching circuit 20: one channel provides signals to the routing circuit 50 without amplification, and the other channel provides signals to the second antenna 60 (a MS antenna) for transmitting to mobile communication devices such as mobile phones. Its advantage is that the routing circuit 50 will not receive an excessively strong signal, while the routing circuit 50 can usually receive the signals of more frequency bands than the first signal circuit and the signal received by the routing circuit 50 can avoid the influences such as waveform deterioration that are generated after filtering and amplifying through the amplifying chain of the first signal circuit. At the same time, the first signal circuit can continue to work, which is meaningful for the situation where the first signal circuit has a plurality of frequency bands. Because the routing circuit 50 and other devices usually only use a part of the frequency band of the first signal circuit, if the routing circuit 50 does not use the signal amplified by the first signal circuit, the mobile terminals such as mobile phones in the area covered by the second antenna 60 will still continue to use the signals amplified by certain frequency bands of the first signal circuit.

Description of the Scheme of the Uplink Signal:

As shown in FIG. 2, after the uplink transmission signal of a mobile communication device such as a mobile phone is received by the second antenna 60 (a MS antenna), it goes to the amplifier 2 (the amplifier after the duplexer is usually a low noise amplifier (LNA) to ensure a good noise figure or signal-to-noise ratio, which is used to ensure that the noise figure or signal-to-noise ratio of the signal received at the second antenna 60 will not be obviously deteriorated, so that the signal will not interfere with the base station after being amplified by the amplification chain after LNA and transmitted through the first antenna 10) after passing through the duplexer 2. After the amplifier 2 amplifies the uplink signal, the signal goes to the attenuator 1 and passes through the isolator/circulator, and then the signal goes to a signal distribution port of the uplink power divider/electric bridge.

The uplink signal of the routing circuit 50 such as MiFi or other device passes through the second switching circuit 40. When it is detected that the signal received by the first antenna 10 (a BS antenna) is weak, the switch in the second switching circuit 40 will connect the signal interface of the routing circuit 50 with the duplexer 5. The duplexer 5 transmits the uplink signal to the attenuator 3 to pass through the isolator 2/circulator, then the signal goes to another signal distribution port of the uplink power divider 1/electric bridge.

The uplink power divider 1/electric bridge combines the above-mentioned signal from the first uplink branch 301 (UL) and the uplink signal from MiFi or other device into one channel to output to the amplifier 1 (which is usually a power amplifier (PA)) for amplifying the signal to sufficient power, and the signal passes through the first switching circuit 20 after the duplexer 1 then transmits by the first antenna 10 (a BS antenna) so as to be received by the base station.

The detector 1 detects the uplink signal to convert into a signal that can be processed by the first control circuit 60. The first control circuit 60 processes or analyzes the signal to generate a first attenuation control signal for controlling the attenuator 1 to adjust the link parameters. The control method and description of the link are the same as those described above for the first downlink branch 302, and will not be repeated herein.

The detector 3 detects the uplink signal of MiFi to provide to the first control circuit 60 after processing so as to generate a third attenuation control signal, thereby controlling the attenuator 3 to adjust the parameters of the second uplink branch 303. The control method and description of the link are the same as those described above for the first downlink branch 302, and will not be repeated herein. However, when the attenuator of the first uplink branch 301 attenuates the gain of the attenuator 1 due to interference such as self-excitation, the second uplink branch 303 does not affected and the attenuation value remains unchanged, which solves the problem that the mobile communication device such as a mobile phone may not work well due to the low gain after the first downlink branch 302 has interference attenuation gain by further providing network services through providing Wi-Fi hotspots using mobile devices such as mobile phones through the part of MiFi.

It should be noted that in the case of weak signals, devices such as MiFi and mobile communication devices such as mobile phones near the second antenna 60 (a MS antenna) usually transmit strong uplink signals, which may cause the output power of the uplink amplifier to be too large or overload, and may even interfere with the base station. Therefore, the signal control circuits, for example, the detector 1, the attenuator 1, the detector 3 and the attenuator 3 of the uplink and the MiFi uplink usually cannot be omitted, so that the uplink transmitted signal is within a reasonable range. The uplink signals of devices such as MiFi and mobile communication devices such as mobile phones near the second antenna 60 (a MS antenna) usually transmit strong uplink signals may cause the detector 1 and the detector 3 to detect each other's signals and result in the detection interference of each other. Therefore, the power divider/electric bridge in the uplink can play the effect of detection isolation. The power divider/electric bridge can usually provide about 15 dB isolation for the detector 1 and the detector 3. If better isolation is required, an isolation component or module such as a radio frequency isolator or a circulator can be added between the distribution port of the power divider/electric bridge and the detector.

In order to solve the above-mentioned problems, the present disclosure further provides a signal communication system, a base station for signal communication system, a mobile terminal, a routing terminal and the above-mentioned signal communication terminal.

In which, the base station of the signal communication system communicates with the first antenna 10 of the signal communication terminal; the mobile terminal communicates with the second antenna 60; and the routing terminal communicates with the routing circuit 50.

It should be noted that, in the present disclosure, since the signal communication system includes all the functions of the above-mentioned signal communication terminal, the signal communication system can also implement all the schemes of the signal communication terminal and has the same beneficial effects, which will not be repeated herein.

The technical features of the above-mentioned embodiments can be combined arbitrarily. In order to make the description simple, not all possible combinations of the technical features in the above-mentioned embodiments are described. However, as long as there is no contradiction in a combination of these technical features, the combination should be considered to be within the range of the description of the present disclosure.

What is claimed is:

1. A signal communication terminal comprising:
   a plurality of signal enhancement branches each including a first antenna, a second antenna, a first switching circuit, a second switching circuit, and a first signal processing circuit; and
   a routing circuit connected with each of the signal enhancement branches to receive an uplink signal and to send a downlink signal, wherein the routing circuit outputs a corresponding first switching signal and second switching signal according to the downlink signal;
   wherein, the first switching circuit is connected with each of the first antenna and the first signal processing circuit; the second switching circuit is connected with each of the first signal processing circuit and the routing circuit; and the first signal processing circuit is connected with the second antenna;
   wherein, the first antenna is configured to receive a first downlink signal and send a first uplink signal;
   wherein, the second antenna is configured to send the first downlink signal and receive the first uplink signal;
   wherein, the first switching circuit is configured to switch a path between the first switching circuit and the second switching circuit according to the first switching signal;
   wherein, the second switching circuit is configured to switch the path between the first switching circuit and the second switching circuit according to the second switching signal so as to work together with the first switching circuit to:
   turn on at least one of a path among the first switching circuit, the first signal processing circuit, and the second switching circuit and a path among the first switching circuit, the first signal processing circuit, and the second antenna so as to output at least one of the first downlink signal after conversion and amplification processing and the first uplink signal after conversion and amplification processing, in response to a strength of the first downlink signal being lower than a preset first signal strength; and
   turn on a path between the first switch circuit and the second switch circuit so as to directly output at least one of the first downlink signal and the first uplink signal, in response to the strength of the first downlink signal being higher than or equal to the preset first signal strength;
   wherein the first antenna is a BS (base station) downlink diversity antenna, and the second antenna is a BS downlink diversity antenna; wherein the first signal processing circuit includes a filter 1, an amplifier 5, a power divider 4, an attenuator 5 and a filter 2, where an input terminal of the filter 1 is a first terminal of the first signal processing circuit, an output terminal of the filter 1 is connected with an input terminal of the amplifier 5, an input terminal of the power divider 4 is connected with an output terminal of the amplifier 5, a first output terminal of the power divider 4 is connected with an input terminal of the attenuator 5, a second output terminal of the power divider 4 is the second terminal of the first signal processing circuit, an output terminal of the attenuator 5 is connected with an input terminal of the filter 2, and an output terminal of the filter 2 is the third terminal of the first signal processing circuit.

2. The signal communication terminal of claim 1, wherein the first signal processing circuit includes a first terminal, a second terminal and a third terminal, the first switching circuit includes a first terminal, a second terminal and a third terminal, the second switching circuit includes a first terminal, a second terminal and a third terminal, and the routing circuit has a first terminal; wherein the first terminal of the first signal processing circuit is connected with the first terminal of the first switching circuit, the second terminal of the first signal processing circuit is connected with the first terminal of the second switching circuit, and the third terminal of the first signal processing circuit is connected with the second antenna; wherein the second terminal of the first switching circuit is connected with the second terminal of the second switching circuit, and the third terminal of the first switching circuit is connected with the first antenna; wherein the third terminal of the second switching circuit is connected with the first terminal of the routing circuit.

3. The signal communication terminal according to claim 2, wherein the first switching circuit further includes a controlled terminal, the second switching circuit further includes a controlled terminal;
   wherein, both the controlled terminal of the first switching circuit and the controlled terminal of the second switching circuit are connected with one of the routing circuit and a first control circuit, where the signal communication terminal further includes the first control circuit electrically connected with at least one of the first antenna, the second antenna, and the routing circuit; and wherein, the first control circuit is configured to obtain at least one of the first downlink signals in the first antenna, the second antenna and the routing circuit, and turn on at least one of a path among the first switching circuit, the first signal processing circuit and the second switching circuit and a path among the first switching circuit, the first signal processing circuit and the second antenna so as to output at least one of the first downlink signal after conversion and amplification processing and the first uplink signal after conversion and amplification processing in response to the strength of any one of the first downlink signals being lower than the preset first signal strength.

4. The signal communication terminal according to claim 2, wherein:

the first signal processing circuit includes N first uplink branches, N first downlink branches, N second uplink branches, N second downlink branches, N first duplex branches, N second duplex branches, and N third duplex branches; where the first duplex branch has an input and output terminal, an uplink signal input terminal and a downlink signal output terminal, the second duplex branch has an input and output terminal, an uplink signal output terminal and a downlink signal input terminal, the third duplex branch has an input and output terminal, an uplink signal output terminal and a downlink signal input terminal, the first downlink branch includes an input terminal, a first output terminal and a second output terminal, and the first uplink branch includes a first input terminal, a second input terminal and an output terminal;

in response to N=1, the downlink signal output terminal of the first duplex branch is connected with the input terminal of the first downlink branch, the uplink signal input terminal of the first duplex branch is connected with the output terminal of the first uplink branch, and the input and output terminal of the first duplex branch is the first terminal of the first signal processing circuit; the downlink signal input terminal of the second duplex branch is connected with the first output terminal of the first downlink branch, the uplink signal output terminal of the second duplex branch is connected with the first input terminal of the first uplink branch, and the input and output terminal of the second duplex branch is the third terminal of the first signal processing circuit; the input terminal of the second uplink branch is connected with the uplink signal output terminal of the third duplex branch, and the output terminal of the second uplink branch is connected with the second input terminal of the first uplink branch; the input terminal of the second downlink branch is connected with the second output terminal of the first downlink branch, and the output terminal of the second downlink branch is connected with the downlink signal input terminal of the third duplex branch; and the input and output terminal of the third duplex branch is the second terminal of the first signal processing circuit; and in response to N being an integer larger than or equal to 2, the first signal processing circuit further includes a first combining branch, a second combining branch and a third combining branch; the downlink signal output terminal of the N-th first duplex branch is connected with the input terminal of the N-th first downlink branch, and the uplink signal input terminal of the N-th first duplex branch is connected with the output terminal of the N-th first uplink branch; the input and output terminals of the N first duplex branches are all connected with the first combining branch, and the signal exchange terminal of the first combining branch is the first terminal of the first signal processing circuit; the downlink signal input terminal of the N-th second duplex branch is connected with the first output terminal of the N-th first downlink branch, and the uplink signal output terminal of the N-th second duplex branch is connected with the firs input terminal of the N-th first uplink branch; the input and output terminals of the N second duplex branches are all connected with the second combining branch, and the signal exchange terminal of the second combining branch is the third terminal of the first signal processing circuit; the input terminal of the N-th second uplink branch is connected with the uplink signal output terminal of the N-th third duplex branch, and the output terminal of the N-th second uplink branch is connected with the second input terminal of the N-th first uplink branch; the input terminal of the N-th second downlink branch is connected with the second output terminal of the N-th first downlink branch, and the output terminal of the N-th second downlink branch is connected with the downlink branch input terminal of the N-th third downlink branch; and the input and output terminals of the N-th third duplex branches are all connected with the third combining branch, and the signal exchange terminal of the third combining branch is the second terminal of the first signal processing circuit;

the first combining branch is configured to one of combine output frequency bands of the N first uplink branch of the first signal processing circuit into the uplink signal to output to the first antenna and split the downlink signal input by the first antenna to input to the N first downlink branches of the first signal processing circuit;

the second combining branch is configured to one of combine output frequency bands of the N first downlink branch of the first signal processing circuit into the downlink signal to output to the second antenna and split the uplink signal input by the second antenna to input to the N first uplink branches of the first signal processing circuit; and the third combining branch is configured to one of combine output frequency bands of the N second downlink branch of the first signal processing circuit into the downlink signal to output to the routing circuit and split the uplink signal input by the routing circuit to input to the N second uplink branches of the first signal processing circuit.

5. The signal communication terminal according to claim 4, wherein:

the first uplink branch includes an amplifier 1, a power divider 1, an attenuator 1 and an amplifier 2, where an input terminal of the amplifier 2 is the first input terminal of the first uplink branch, an output terminal of the amplifier 2 is connected with an input terminal of the attenuator 1, a first input terminal of the power divider 1 is connected with an output terminal of the attenuator 1, a second input terminal of the power divider 1 is the second input terminal of the first uplink branch, an output terminal of the power divider 1 is connected with an input terminal of the amplifier 1, and an output terminal of the amplifier 1 is the output terminal of the first uplink branch; and the first downlink branch includes an amplifier 3, a power divider 2, an attenuator 2 and an amplifier 4, where an input terminal of the amplifier 3 is the input terminal of the first downlink branch, an output terminal of the amplifier 3 is connected with an input terminal of the power divider 2; a first output terminal of the power divider 2 is connected with an input terminal of the attenuation 2, a second output terminal of the power divider 2 is the second output terminal of the first downlink branch; the output terminal of the attenuator 2 is connected with an input terminal of the amplifier 4; and an output terminal of the amplifier 4 is the first output terminal of the first downlink branch.

6. The signal communication terminal according to claim 5, wherein:

the second uplink branch includes an attenuator 3, where an input terminal of the attenuator 3 is the input terminal of the second uplink branch, and an output terminal of the attenuator 3 is the output terminal of the second uplink branch; and the second downlink branch includes an attenuator 4, where an input terminal of the attenuator 4 is the input terminal of the second downlink branch, and an output terminal of the attenuator 4 is the output terminal of the second downlink branch.

7. The signal communication terminal according to claim 6, further including a second control circuit and a detection branch disposed with any one of the first uplink branch, the first downlink branch, the second uplink branch and the second downlink branch in one-to-one manner, where the second control circuit includes control terminals disposed corresponding to a number of the attenuators, and a detection terminal of the detection branch is disposed at the output terminal of the amplifiers in any of the branches, an output terminal of each detection branch is connected with the second control circuit, and the control terminals of the second control circuit are connected with one of the first uplink branch, a controlled terminal of the attenuator of the first downlink branch and the second downlink branch, and the controlled terminal of the attenuator of the second downlink branch in one-to-one manner.

8. The signal communication terminal according to claim 2, wherein the first switching circuit includes a switching switch 1, a switching switch 2 and a power divider 3, where a first connecting terminal of the switching switch 1 is the third terminal of the first switching circuit, a second connecting terminal of the switching switch 1 is connected with a first connecting terminal of the switching switch 2, and a third connecting terminal of the switching switch 1 is connected with a first terminal of the power divider 3; and a second connecting terminal of the switching switch 2 is the first terminal of the first switching circuit, a third connecting terminal of the switching switch 2 is connected with a second terminal of the power divider 3, and a third terminal of the power divider 3 is the second terminal of the first switching circuit.

9. A signal communication terminal comprising:

a plurality of signal enhancement branches each including a first antenna, a second antenna, a first switching circuit, a second switching circuit, and a first signal processing circuit; and a routing circuit connected with each of the signal enhancement branches to receive an uplink signal and to send a downlink signal, wherein the routing circuit outputs a corresponding first switching signal and second switching signal according to the downlink signal;

wherein, the first switching circuit is connected with each of the first antenna and the first signal processing circuit; the second switching circuit is connected with each of the first signal processing circuit and the routing circuit; and the first signal processing circuit is connected with the second antenna;

wherein, the first antenna is configured to receive a first downlink signal and send a first uplink signal;

wherein, the second antenna is configured to send the first downlink signal and receive the first uplink signal;

wherein, the first switching circuit is configured to switch a path between the first switching circuit and the second switching circuit according to the first switching signal;

wherein, the second switching circuit is configured to switch the path between the first switching circuit and the second switching circuit according to the second switching signal so as to work together with the first switching circuit to:

turn on at least one of a path among the first switching circuit, the first signal processing circuit, and the second switching circuit and a path among the first switching circuit, the first signal processing circuit, and the second antenna so as to output at least one of the first downlink signal after conversion and amplification processing and the first uplink signal after conversion and amplification processing, in response to a strength of the first downlink signal being lower than a preset first signal strength; and turn on a path between the first switch circuit and the second switch circuit so as to directly output at least one of the first downlink signal and the first uplink signal, in response to the strength of the first downlink signal being higher than or equal to the preset first signal strength;

wherein the first signal processing circuit includes a first terminal, a second terminal and a third terminal, the first switching circuit includes a first terminal, a second terminal and a third terminal, the second switching circuit includes a first terminal, a second terminal and a third terminal, and the routing circuit has a first terminal; wherein the first terminal of the first signal processing circuit is connected with the first terminal of the first switching circuit, the second terminal of the first signal processing circuit is connected with the first terminal of the second switching circuit, and the third terminal of the first signal processing circuit is connected with the second antenna; wherein the second terminal of the first switching circuit is connected with the second terminal of the second switching circuit, and the third terminal of the first switching circuit is connected with the first antenna; wherein the third terminal of the second switching circuit is connected with the first terminal of the routing circuit;

the first signal processing circuit includes N first uplink branches, N first downlink branches, N second uplink branches, N second downlink branches, N first duplex branches, N second duplex branches, and N third duplex branches; where the first duplex branch has an input and output terminal, an uplink signal input terminal and a downlink signal output terminal, the second duplex branch has an input and output terminal, an uplink signal output terminal and a downlink signal input terminal, the third duplex branch has an input and output terminal, an uplink signal output terminal and a downlink signal input terminal, the first downlink branch includes an input terminal, a first output terminal and a second output terminal, and the first uplink branch includes a first input terminal, a second input terminal and an output terminal;

in response to N=1, the downlink signal output terminal of the first duplex branch is connected with the input terminal of the first downlink branch, the uplink signal input terminal of the first duplex branch is connected with the output terminal of the first uplink branch, and the input and output terminal of the first duplex branch is the first terminal of the first signal processing circuit; the downlink signal input terminal of the second duplex branch is connected with the first output terminal of the first downlink branch, the uplink signal output terminal of the second duplex branch is connected with the first input terminal of the first uplink branch, and the input and output terminal of the second duplex branch is the third terminal of the first signal processing circuit; the input terminal of the second uplink branch is connected with the uplink signal output terminal of the third duplex branch, and the output terminal of the second uplink branch is connected with the second input terminal of the first uplink branch; the input terminal of the second downlink branch is connected with the second output terminal of the first downlink branch, and the output terminal of the second downlink branch is connected with the downlink signal input terminal of the third duplex branch; and the input and output terminal of the third duplex branch is the second terminal of the first signal processing circuit; and in response to N being an integer larger than or equal to 2, the first signal processing circuit further includes a first combining branch, a second combining branch and a third combining branch; the downlink signal output terminal of the N-th first duplex branch is connected with the input terminal of the N-th first downlink branch, and the uplink signal input terminal of the N-th first duplex branch is connected with the output terminal of the N-th first uplink branch; the input and output terminals of the N first duplex branches are all connected with the first combining branch, and the signal exchange terminal of the first combining branch is the first terminal of the first signal processing circuit; the downlink signal input terminal of the N-th second duplex branch is connected with the first output terminal of the N-th first downlink branch, and the uplink signal output terminal of the N-th second duplex branch is connected with the firs input terminal of the N-th first uplink branch; the input and output terminals of the N second duplex branches are all connected with the second combining branch, and the signal exchange terminal of the second combining branch is the third terminal of the first signal processing circuit; the input terminal of the N-th second uplink branch is connected with the uplink signal output terminal of the N-th third duplex branch, and the output terminal of the N-th second uplink branch is connected with the second input terminal of the N-th first uplink branch; the input terminal of the N-th second downlink branch is connected with the second output terminal of the N-th first downlink branch, and the output terminal of the N-th second downlink branch is connected with the downlink branch input terminal of the N-th third downlink branch; and the input and output terminals of the N-th third duplex branches are all connected with the third combining branch, and the signal exchange terminal of the third combining branch is the second terminal of the first signal processing circuit;

the first combining branch is configured to one of combine output frequency bands of the N first uplink branch of the first signal processing circuit into the uplink signal to output to the first antenna and split the downlink signal input by the first antenna to input to the N first downlink branches of the first signal processing circuit;

the second combining branch is configured to one of combine output frequency bands of the N first downlink branch of the first signal processing circuit into the downlink signal to output to the second antenna and split the uplink signal input by the second antenna to input to the N first uplink branches of the first signal processing circuit; and the third combining branch is configured to one of combine output frequency bands of the N second downlink branch of the first signal processing circuit into the downlink signal to output to the routing circuit and split the uplink signal input by the routing circuit to input to the N second uplink branches of the first signal processing circuit.

* * * * *